No. 891,085. PATENTED JUNE 16, 1908.
M. L. LEAHY.
BAKING PAN.
APPLICATION FILED DEC. 24, 1907.
2 SHEETS—SHEET 1.
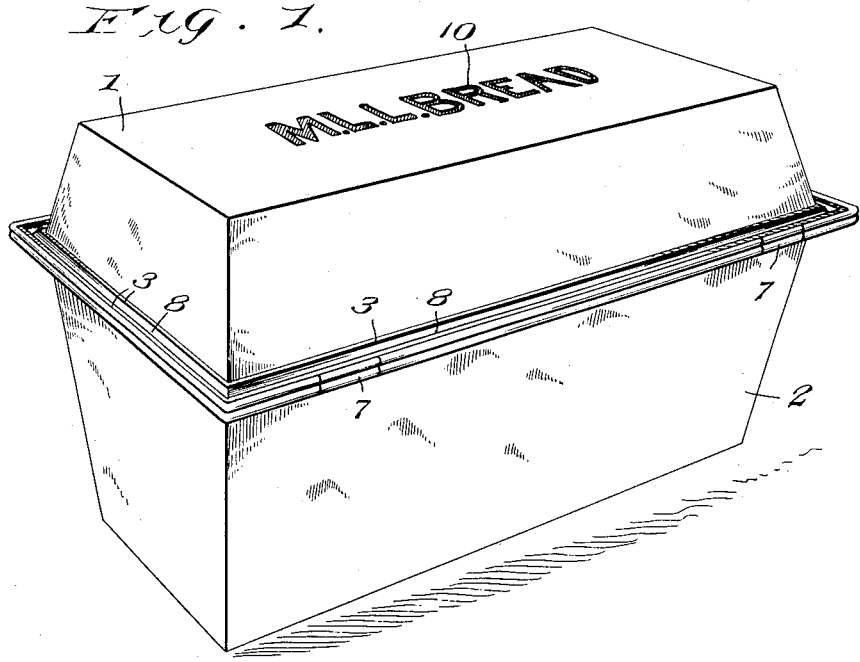
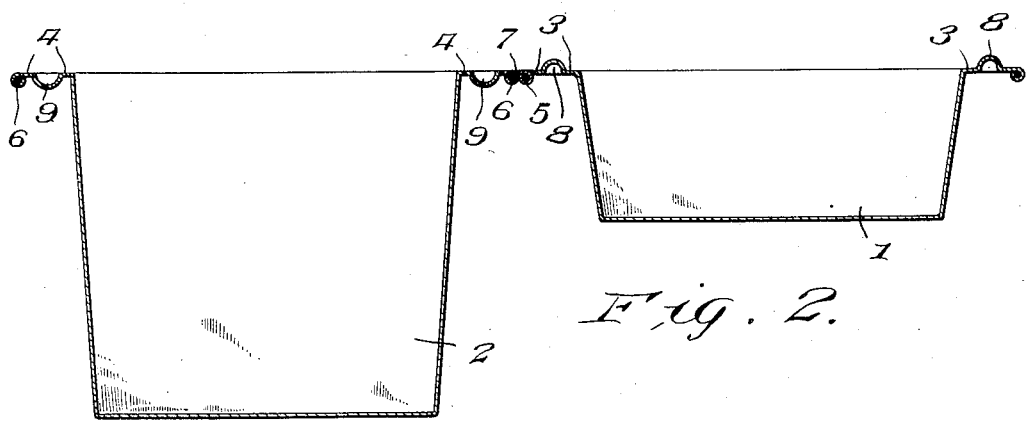
WITNESSES:
INVENTOR
M. L. Leahy
BY
W. J. Fitzgerald & Co
Attorneys No. 891,085. PATENTED JUNE 16, 1908.
M. L. LEAHY.
BAKING PAN.
APPLICATION FILED DEC. 24, 1907.
2 SHEETS—SHEET 2.
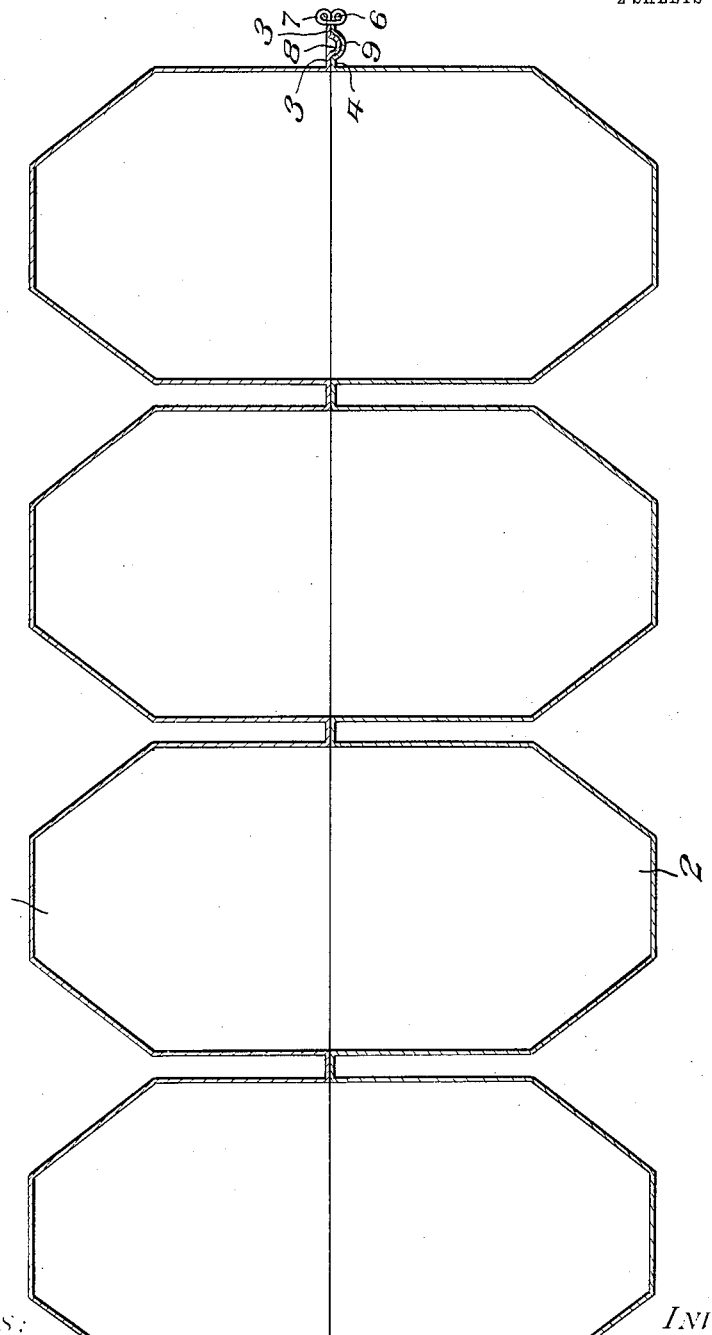

UNITED STATES PATENT OFFICE.

MICHAEL LAWRENCE LEAHY, OF NORMAN, OKLAHOMA.

BAKING-PAN.

No. 891,085.

Specification of Letters Patent.

Patented June 16, 1908.

Application filed December 24, 1907. Serial No. 407,914.

*To all whom it may concern:*

Be it known that I, MICHAEL LAWRENCE LEAHY, a citizen of the United States, residing at Norman, in the county of Cleveland and State of Oklahoma, have invented certain new and useful Improvements in Baking-Pans; and I do hereby declare the following to be a full, clear, and exact description of the invention, such as will enable others skilled in the art to which it appertains to make and use the same.

My invention relates to new and useful improvements in baking pans and more particularly to that class adapted to be used for baking bread or similar articles and my object is to provide a pan of this class whereby a single or plurality of loaves may be baked.

A further object is to provide means for forming a seal around the edge of the pan to prevent the contents of the pan from passing between the edges of the two sections thereof, and a still further object is to provide means for forming an imprint in the top and bottom of the loaf of bread.

Other objects and advantages will be hereinafter referred to and more particularly pointed out in the claims.

In the accompanying drawings which are made a part of this application, Figure 1 is a perspective view of a single pan, showing the same in its closed position. Fig. 2 is a transverse, vertical sectional view of the pan in its open position, and, Fig. 3 is a sectional view through a pan having a plurality of compartments.

Referring to the drawings in which similar reference numerals designate corresponding parts throughout the several views, 1 and 2 indicate the top and bottom sections, respectively, of my improved form of baking pan, which may be constructed in the usual or any preferred form, each of said sections having its free portions bent to form a flange 3 and 4, respectively, surrounding the open edge of the pan and extending at right angles to the vertical plane of the pans and, if desired, said flanges may be coiled around re-inforcing wires 5 and 6, respectively, thereby forming a bead around the edge of each section. The two sections are preferably hinged together as best shown in Fig. 2, by cutting away a portion of the coiled sections of the flanges 3 and 4 and disposing straps 7 around the disposed portions of the wires 5 and 6, said straps forming the hinges between the two sections.

In preparing the bread-stuff for baking, the two sections of the pan are filled with the dough and the section 1 swung over the sections 2 and, in order to prevent the dough from passing between the edges of the two sections, particularly when the two sections are slightly extended by heat, the flange 3 is provided with a rib 8, approximately semi-circular in cross section which is adapted to seat in a gutter 9 formed in the flange 4, said rib and gutter forming a complete seal between the meeting edges of the two sections when the sections are in their closed positions. It is also to be stated that the gutter 9 is semi-circular in cross section.

As best shown in Fig. 1, an imprint is formed in the loaf of bread by providing raised letters 10 in the bottoms of the sections 1 and 2, said raised letters forming indentations in the dough placed in the pans and will leave depressions in the loaf of bread similar to the outline of the raised letters on the pan, thereby obviating the necessity of employing a separate label for the loaf.

As best shown in Fig. 3, a plurality of loaves may be simultaneously baked by increasing the number of sections and providing a plurality of baking spaces and, in this instance, the ribs 8 and gutters 9 are formed in the flanges extending along the ends of the several compartments and across the sides of the two outer compartments, but, if preferred, a rib and corresponding gutter may be placed longitudinally between each pair of compartments.

In Figs. 1 and 2 of the drawings I have shown the top and bottom sections of unequal depth and said sections are tapered from their open to their closed edges, while in Fig. 3 of the drawings, I have shown the top and bottom sections of the same depth and tapered at varied angles from their open to their closed edges, that form of inclination shown in Fig. 3 being preferable, as the loaves may be more readily removed from the sections when the walls of the pan are inclined in the manner shown.

It will thus be seen that I have provided a very cheap and economical form of baking pan and one wherein the dough will be prevented from passing between the meeting edges of the two sections forming the pan.

It will further be seen that the two sections of the pan may be quickly separated to remove the loaves therefrom, after the same have been baked, and, by providing the raised letters in the bottoms of the pans, an imprint will be formed in the top and bottom of the loaves.

What I claim is:

A baking pan comprising an upper and a lower section, the free edge portion of each section being bent outwardly at approximately right angles to form a continuous flange, the flange of the lower section having formed therein a gutter intermediate its width and the flange of the upper section having a rib formed intermediate its width to project within the gutter of the lower section, said rib and gutter being approximately semi-circular in cross section, reinforcing rods carried by the free edge portions of the flanges, said free edge portions being bent around said rods, parts of the bent portions of the flanges being cut away to expose the rods, and straps engaging the exposed portions of the rods for hingedly engaging the sections one to the other.

In testimony whereof I have signed my name to this specification in the presence of two subscribing witnesses.

MICHAEL LAWRENCE LEAHY.

Witnesses:
J. C. JONAS,
J. G. LINDSAY.